(12) United States Patent
Snapp

(10) Patent No.: US 6,725,243 B2
(45) Date of Patent: Apr. 20, 2004

(54) METHOD FOR PREVENTING IMPROPER CORRECTION OF A DATABASE DURING AN UPDATING PROCESS

(75) Inventor: Robert F. Snapp, Memphis, TN (US)

(73) Assignee: United States Postal Service, Washington, DC (US)

(*) Notice: Subject to any disclaimer, the term of this patent is extended or adjusted under 35 U.S.C. 154(b) by 0 days.

(21) Appl. No.: 10/384,875

(22) Filed: Mar. 7, 2003

(65) Prior Publication Data

US 2003/0172064 A1 Sep. 11, 2003

Related U.S. Application Data

(60) Provisional application No. 60/362,310, filed on Mar. 8, 2002.

(51) Int. Cl.[7] .......................... G06F 12/00; G06F 17/30
(52) U.S. Cl. ........................ 707/203; 707/206
(58) Field of Search ................. 707/200, 203, 707/8, 201, 206, 202

(56) References Cited

U.S. PATENT DOCUMENTS

| | | | | |
|---|---|---|---|---|
| 5,710,922 A | * | 1/1998 | Alley et al. | 707/201 |
| 5,729,735 A | * | 3/1998 | Meyering | 707/10 |
| 5,758,150 A | * | 5/1998 | Bell et al. | 707/10 |
| 5,758,355 A | * | 5/1998 | Buchanan | 707/201 |
| 5,870,759 A | | 2/1999 | Bauer et al. | 707/201 |
| 5,926,816 A | * | 7/1999 | Bauer et al. | 707/8 |
| 6,226,650 B1 | * | 5/2001 | Mahajan et al. | 707/201 |
| 6,289,357 B1 | | 9/2001 | Parker | 707/702 |
| 6,389,423 B1 | | 5/2002 | Sakakura | 707/10 |
| 6,393,434 B1 | * | 5/2002 | Huang et al. | 707/200 |
| 6,457,012 B1 | | 9/2002 | Jatkowski | 707/101 |
| 6,496,838 B1 | * | 12/2002 | Zamora-McKelvy et al. | 707/201 |
| 6,526,417 B1 | | 2/2003 | Perry | 707/202 |
| 6,560,700 B1 | | 5/2003 | Birkler et al. | 713/1 |

OTHER PUBLICATIONS

Cardno et al., "Method and System for Matching Data", Sep. 5, 2002, Pub. No.: US 2002/0124015 A1.*

* cited by examiner

Primary Examiner—Greta Robinson
Assistant Examiner—Susan Rayyan
(74) Attorney, Agent, or Firm—Jeffrey Weiss; Harry M. Weiss; Weiss, Moy & Harris, P.C.

(57) ABSTRACT

Updating of information contained in a database is provided, in a more accurate manner, through the use of an update file as part of a coding engine. In particular, a database containing a plurality of data entries is provided to a coding engine. The coding engine will compare the data entries to a reference database. It will leave undisturbed those entries that match entries in the reference database. Entries in the database that do not match will be compared against information contained against an update file, with the update file reflecting events occurring after the last revision of the reference database. In one embodiment, the coding engine is utilized to update street address databases.

19 Claims, 3 Drawing Sheets

| ZIP | Pre | Street | Suff | Post |
|---|---|---|---|---|
| 30909 | | HIGHGATE | | W |
| 31008 | | JUNIPER CREEK | DR | |
| 31008 | | JUNIPER CREEK | RD | |
| 31014 | | RAILROAD | AVE | |
| 31014 | | THOMPSON | RD | |
| 31021 | | HONEYSUCKLE | CIR | |
| 31021 | | WILLA | CT | |
| 31023 | | SPARROW | LN | |
| 31023 | | SYCAMORE | DR | |
| 31030 | | FINCH | LN | |
| 31030 | | US HIGHWAY 341 | S | |
| 31032 | | CLINTON CROSSING | LN | |
| 31032 | | OAK | DR | |
| 31044 | | HIGHWAY 80 | | |
| 31061 | | WATERFORD | CT | |
| 31061N | | CHANDLER | CIR | SE |
| 31064 | | CARDINAL | DR | |
| 31064 | | KILLDEER | LN | |
| 31064 | | PHEASANT | DR | |
| 31072 | | 9TH | AVE | W |
| 31072 | | MCDONALD | AVE | W |
| 31075E | | BIRDSONG | LN | |
| 31075E | | PINE NEEDLE | LN | |
| 31087 | | HICKORY | CT | |
| 31092 | | DRAYTON | LN | |
| 31206 | | FORTY ONE | CIR | |

Figure 1

METHOD FOR PREVENTING IMPROPER CORRECTION OF A DATABASE DURING AN UPDATING PROCESS

RELATED APPLICATION

This non-provisional application claims priority from provisional application No. 60/362,310, filed on Mar. 8, 2002.

FIELD OF THE INVENTION

This invention relates generally to methods for updating information contained in a first database, by reference to information contained in a second database, through the use of an early warning system that limits the risk of improper correction.

BACKGROUND OF THE INVENTION

There are various circumstances in which it is appropriate to correct information in a first database, by reference to information contained in a second database. For example, the Postal Service and other organizations that maintain address databases have a regular need to update those address databases so that they contain accurate information. An updating process, in this regard, serves to improve the accuracy of the address database by removing or correcting inaccurate addresses.

In the past, the updating of an address database was accomplished by running that database through a coding engine, whereby the entries in the address database would be compared to entries in a reference database, containing all possible addresses within a particular region. In the event that the Coding engine determined that a checked address matched one contained in the reference database, the coding engine would leave the checked address unchanged. However, if the checked address did not match the standard addresses contained in the reference database, the coding engine would delete or change the checked address.

However, the reference database utilized by the coding engine will often lag behind changes that occur in the particular region that they cover. For example, newly added streets may not be reflected in the reference database, with the result that a proper new address in an address database is erroneously recognized as being incorrect, and is either deleted or changed.

A need therefore existed for a method for updating and correcting address databases, that permits a coding engine to take into account recent address-related changes that are not contained in the reference database. In particular, a need existed for an updating and correcting method that relies on the use of an update file that acts as an Early Warning System, limiting the occurrence of improper changes or deletions during the updating process. The present invention satisfies these needs and provides other, related, advantages.

SUMMARY OF THE INVENTION

It is an object of the present invention to provide a method for updating and correcting address databases, that permits a coding engine to take into account recent address-related changes that are not contained in a reference database.

It is a further object of the present invention to provide a method for updating and correcting address databases, that relies on the use of an update file that acts as an early warning system, limiting the occurrence of improper changes or deletions during the updating process.

It is a yet further object of the present invention to provide a method for updating and correcting information contained in a first database, by comparing the information therein to information contained in a reference database, and utilizing an early warning system that incorporates more recent information than that contained in the reference database and that screens information in the first database that has been flagged for change or deletion.

The method of the present invention may be embodied in a computer system executing program instructions for carrying out the steps of the method, and further in a computer program product comprising media for storing the program instructions.

BRIEF DESCRIPTION OF THE PREFERRED EMBODIMENTS

In accordance with one embodiment of the present invention, a method for updating information contained in a database is disclosed. The method comprises comprising the steps of: providing a first database containing a plurality of data entries; providing a reference database containing a plurality of reference data entries; providing an update file containing data that is supplemental to that contained in the reference database; comparing the data entries in the first database to the reference data entries in the reference database; identifying a suspect data entry among the data entries in the first database by locating one the data entry that does not match any of the reference data entries in the reference database; comparing the suspect data entry to information contained in the update file; in the event that the suspect data entry matches information contained in the update file, leaving the suspect data entry in the first database in an unchanged condition in the first database; and in the event that the suspect data entry does not match information contained in the update file, one of deleting the suspect data entry from the first database and correcting the data entry in the first database to match the information in the update file.

In accordance with another embodiment of the present invention, a method for updating information contained in a database comprising the steps of: providing a first database containing a plurality of data entries; wherein the first database is an address database; providing a reference database containing a plurality of reference data entries; wherein the reference database is a coding engine; providing an update file containing data that is supplemental to that contained in the reference database; comparing the data entries in the first database to the reference data entries in the reference database; identifying a suspect data entry among the data entries in the first database by locating one the data entry that does not match any of the reference data entries in the reference database; comparing the suspect data entry to information contained in the update file; in the event that the suspect data entry matches information contained in the update file, leaving the suspect data entry in the first database in an unchanged condition in the first database; in the event that the suspect data entry does not match information contained in the update file, one of deleting the suspect data entry from the first database and correcting the data entry in the first database to match the information in the update file; and periodically updating the update file; wherein the step of periodically updating the update file further comprises the step of removing from the update file information that has an age in excess of a specified period of time.

In accordance with yet another embodiment of the present invention, there is disclosed a computer program product comprising signal-bearing media for execution within a computer system that includes a memory for storing program instructions and data coupled to a processor for executing the program instructions, and a data store for storing a first database, a reference database and an update file, and wherein the program instructions comprising program instructions for: comparing data entries in the first database to reference data entries in the reference database; identifying a suspect data entry among the data entries in the first database by locating one the data entry that does not match any of the reference data entries in the reference database; comparing the suspect data entry to information contained in the update file; in the event that the suspect data entry matches information contained in the update file, leaving the suspect data entry in the first database in an unchanged condition in the first database; and in the event that the suspect data entry does not match information contained in the update file, one of deleting the suspect data entry from the first database and correcting the data entry in the first database to match the information in the update file.

BRIEF DESCRIPTION OF THE DRAWINGS

FIG. 1 is an example of a data contained in an update file.

DETAILED DESCRIPTION OF THE PREFERRED EMBODIMENTS

This invention is concerned with the updating of information contained in a first database, through the use of a coding engine (sometimes referred to herein as a "ZIP+4 Engine"). In a preferred embodiment, the first database is an address database. Each data entry in an address database reflects an individual address. This information can include ZIP code information, a street name, a street number, a pre-directional address element (e.g., "N" for north, "E" for east), a street suffix (e.g., "AVE" for avenue, "LN" for lane, etc.), and a post-directional address element (e.g., "SE" for southeast). It should be apparent that data entries could also comprise Post Office box addresses, commercial mail receiving agency addresses, or the like.

Upon inputting of the address database into a coding engine, the coding engine will check the data entries contained therein against a reference database. The reference database will contain all possible addresses within a particular region, preferably with the same level of specificity as contained in the address database. Of course, the particular reference database used by a coding engine to update an address database should include all possible addresses within the area covered by the address database.

The coding engine will further utilize an update file, referred to herein as either an update file or an early warning system. The update file contains information of the same general type as that contained in the reference database; however, the information contained in the update file contains particular information that has been generated since the last updating of the reference database. Referring now to FIG. 1, it contains an example of an excerpt from an update file. As reflected in this excerpt, the update file may contain information at a more general level than the address database or reference file. Thus, as shown in FIG. 1, the update file contains a listing of street names, including ZIP code, pre-directional element, post-directional element, and suffix. However, individual street addresses are not required to be included, though of course it would be possible to include them if desired.

For example, the reference database may reflect that, in a particular geographic area, there is an Oak Street but no Oak Drive. Subsequent to the last updating of the reference database, an Oak Drive is added to that geographic area. In this instance, the addition of Oak Drive (including all then known street address associated therewith) will be reflected in the update file.

Figure 2:
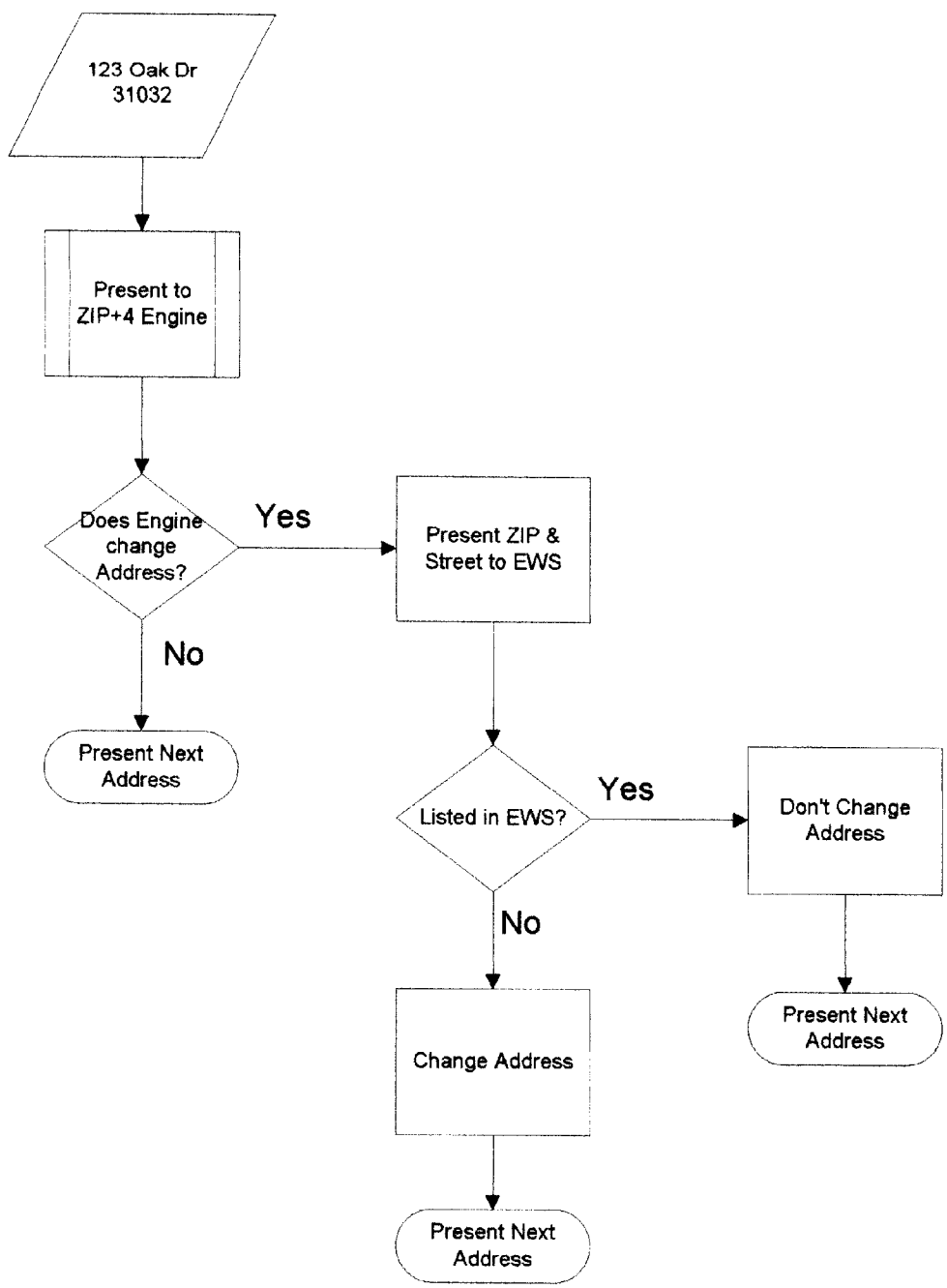
FIG. 2 is a flow chart, illustrating a method consistent with the present invention.

Referring now to FIG. 2, the operation of an updating method consistent with the present invention is shown. A street address is presented to a coding/ZIP+4 engine. The coding engine will compare the presented address with the content of a reference database. If the particular address is present in the reference database exactly as presented, the coding engine will not change the address, and the coding engine will then examine the next address.

On the other hand, if the particular address is not present in the reference database exactly as presently but needs to be changed, the coding engine will present the address to the early warning system. If the address (or at a minimum the portion of the address contained in the update file) is present in the early warning system, the coding engine will not change it, and it will then examine the next address. If the address is not present in the early warning system it will change the address to conform it to the information contained in the reference database or, optionally, will delete it.

Continuing with the example provided above, if the address provided to the coding engine is an Oak Drive address, the coding engine will compare that address to the reference database. Because Oak Drive was added subsequent to the most recent updating of the reference database, a comparison with the reference database will indicate that the address is not correct. However, instead of changing the address as a prior art coding engine would, the Oak Drive address will be presented to the update file. That file will reflect the addition of this new address, and, as a result, the coding engine is warned not to change or delete it.

It will be desired to keep the update file current, through a periodic updating process. For example, the update file could be updated weekly, monthly, or at any other desired interval. As part of the process of updating the update file, it will be desired to remove older information contained therein. At a minimum, as the reference database is itself revised, it will be desired to purge the update file of all information that predates the date of such revision.

While the example of a coding engine utilized to update address databases has been presented, it should be understood that the invention disclosed has broader application. Specifically, it is intended to encompass any method by which information of any kind that is contained in a first database is updated by comparing it to information contained in a second database, wherein an update file is also utilized to prevent improper corrections or deletions relating to new information that post-dates the last revision of the reference database. For example, such a coding engine could be utilized to update a database of amino acid sequences, DNA sequences, or the like.

Figure 3:
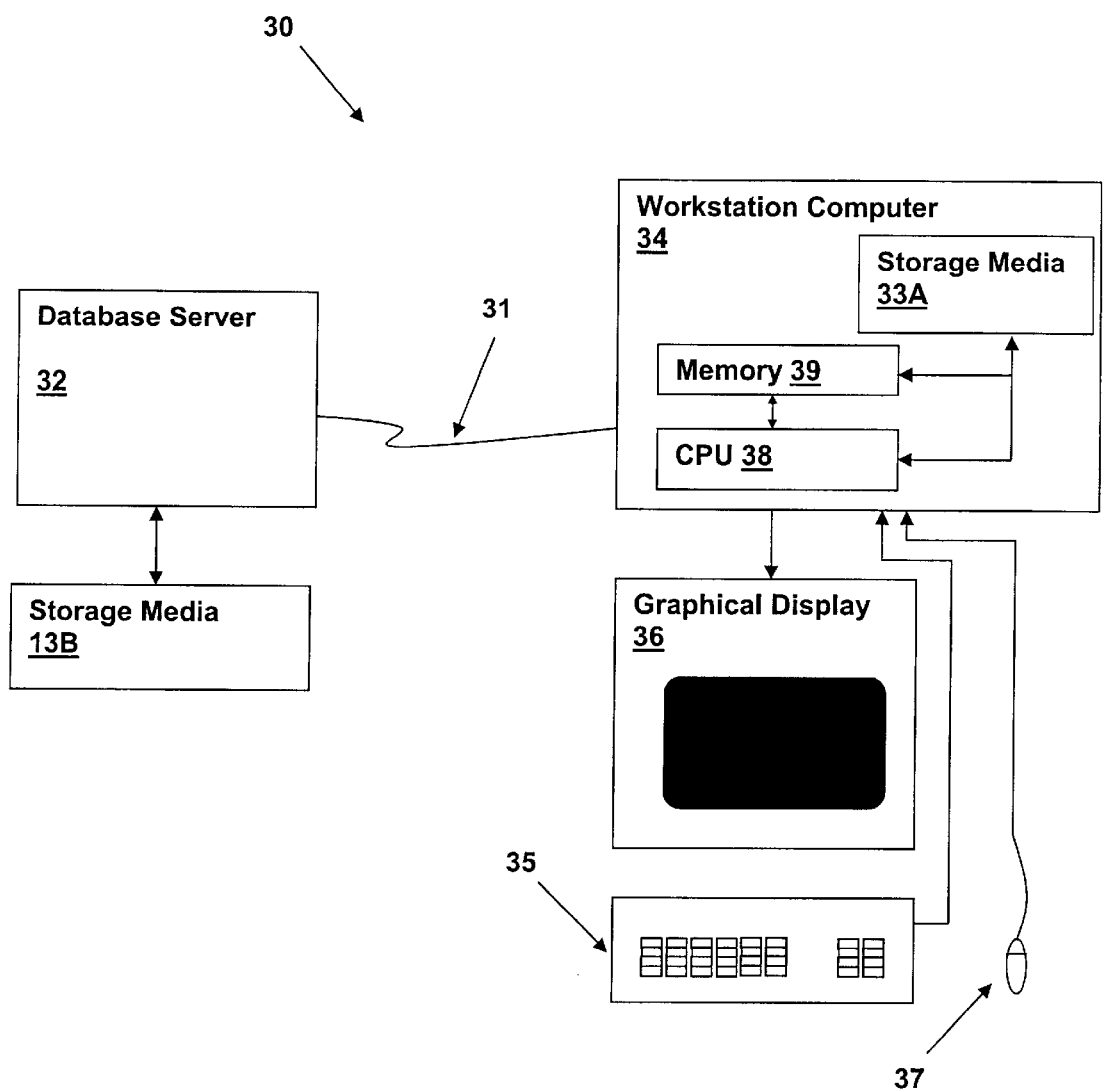
FIG. 3 is a block diagram depicting a computer system in which the method of the present invention is practiced.

Referring now to FIG. 3, there is depicted a computer system 30 within which a method may be performed via the execution of program instructions forming a computer program product in accordance with an embodiment of the present invention. The method may employ program instructions located within a memory 39 of a workstation computer 34 and executed by a central processing unit 38 (CPU) and the databases of the present invention may be located entirely within a storage media 33A and memory 39. Alternatively, workstation computer 34 may be coupled via a network 31 connection for coupling workstation computer 34 to a network such as a local-area network (LAN), wide-area network (WAN) or the Internet. In a network implementation, the data store and/or program instructions for implementing the methods of the present invention may be located within a database server 32 coupled to a storage media 33B.

The method of the present invention provides database update tracking by an end-user for execution on workstation computer 14 or access to the database and execution of the program via the Internet or other network. Other combinations such as local-hosted program with a remote database, local database with remote-hosted program are possible and should be understood to be variations in accordance with embodiments of the present invention.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method for updating information contained in a database comprising the steps of:
    providing a first database containing a plurality of data entries;
    providing a reference database containing a plurality of reference data entries;
    providing an update file containing data that is supplemental to that contained in the reference database;
    comparing the data entries in the first database to the reference data entries in the reference database;
    identifying a suspect data entry among the data entries in the first database by locating one the data entry that does not match any of the reference data entries in the reference database;
    comparing the suspect data entry to information contained in the update file;
    in the event that the suspect data entry matches information contained in the update file, leaving the suspect data entry in the first database in an unchanged condition in the first database; and
    in the event that the suspect data entry does not match information contained in the update file, one of deleting the suspect data entry from the first database and correcting the data entry in the first database to match the information in the update file.

2. The method of claim 1 wherein the first database is an address database.

3. The method of claim 2 wherein the data entries comprise a street name, a street suffix and a ZIP code.

4. The method of claim 3 wherein the data entries further comprise at least one of a pre-directional address element and a post-directional address element.

5. The method of claim 1 wherein the step of providing the update file further comprises the step of periodically updating the update file.

6. The method of claim 5 wherein the step of periodically updating the update file further comprises the step of removing from the update file information that has an age in excess of a specified period of time.

7. A method for updating information contained in a database comprising the steps of:
    providing a first database containing a plurality of data entries;
    wherein the first database is an address database;
    providing a reference database containing a plurality of reference data entries;
    wherein the reference database is a coding engine;
    providing an update file containing data that is supplemental to that contained in the reference database;
    comparing the data entries in the first database to the reference data entries in the reference database;
    identifying a suspect data entry among the data entries in the first database by locating one the data entry that does not match any of the reference data entries in the reference database;
    comparing the suspect data entry to information contained in the update file;
    in the event that the suspect data entry matches information contained in the update file, leaving the suspect data entry in the first database in an unchanged condition in the first database;
    in the event that the suspect data entry does not match information contained in the update file, one of deleting the suspect data entry from the first database and correcting the data entry in the first database to match the information in the update file; and
    periodically updating the update file;
    wherein the step of periodically updating the update file further comprises the step of removing from the update file information that has an age in excess of a specified period of time.

8. A computer system comprising a memory for storing program instructions and data coupled to a processor for executing the program instructions, and a data store for storing a first database, a reference database and an update file, and wherein the program instructions comprising program instructions for:
    comparing data entries in the first database to reference data entries in the reference database;
    identifying a suspect data entry among the data entries in the first database by locating one the data entry that does not match any of the reference data entries in the reference database;
    comparing the suspect data entry to information contained in the update file;
    in the event that the suspect data entry matches information contained in the update file, leaving the suspect data entry in the first database in an unchanged condition in the first database; and
    in the event that the suspect data entry does not match information contained in the update file, one of deleting the suspect data entry from the first database and correcting the data entry in the first database to match the information in the update file.

9. The computer system of claim 8, wherein the first database is an address database.

10. The computer system of claim 8, wherein the data entries comprise a street name, a street suffix and a ZIP code.

11. The computer system of claim 9, wherein the data entries further comprise at least one of a pre-directional address element and a post-directional address element.

12. The computer system of claim 8, wherein the program instructions further comprise program instructions for periodically updating the update file.

13. The computer system of claim 12, wherein the program instructions for updating further comprise program instructions for removing from the update file information that has an age in excess of a specified period of time.

14. A computer program product comprising signal-bearing media for execution within a computer system that includes a memory for storing program instructions and data coupled to a processor for executing the program instructions, and a data store for storing a first database, a reference database and an update file, and wherein the program instructions comprising program instructions for:

comparing data entries in the first database to reference data entries in the reference database;

identifying a suspect data entry among the data entries in the first database by locating one the data entry that does not match any of the reference data entries in the reference database;

comparing the suspect data entry to information contained in the update file;

in the event that the suspect data entry matches information contained in the update file, leaving the suspect data entry in the first database in an unchanged condition in the first database; and in the event that the suspect data entry does not match information contained in the update file, one of deleting the suspect data entry from the first database and correcting the data entry in the first database to match the information in the update file.

15. The computer program product of claim 14, wherein the first database is an address database.

16. The computer program product of claim 14, wherein the data entries comprise a street name, a street suffix and a ZIP code.

17. The computer program product of claim 15, wherein the data entries further comprise at least one of a pre-directional address element and a post-directional address element.

18. The computer program product of claim 14, wherein the program instructions further comprise program instructions for periodically updating the update file.

19. The computer program product of claim 18, wherein the program instructions for updating further comprise program instructions for removing from the update file information that has an age in excess of a specified period of time.

* * * * *